No. 633,612. Patented Sept. 26, 1899.
T. J. PSIMENOS.
BICYCLE.
(Application filed Jan. 7, 1899.)
(No Model.) 2 Sheets—Sheet 1.
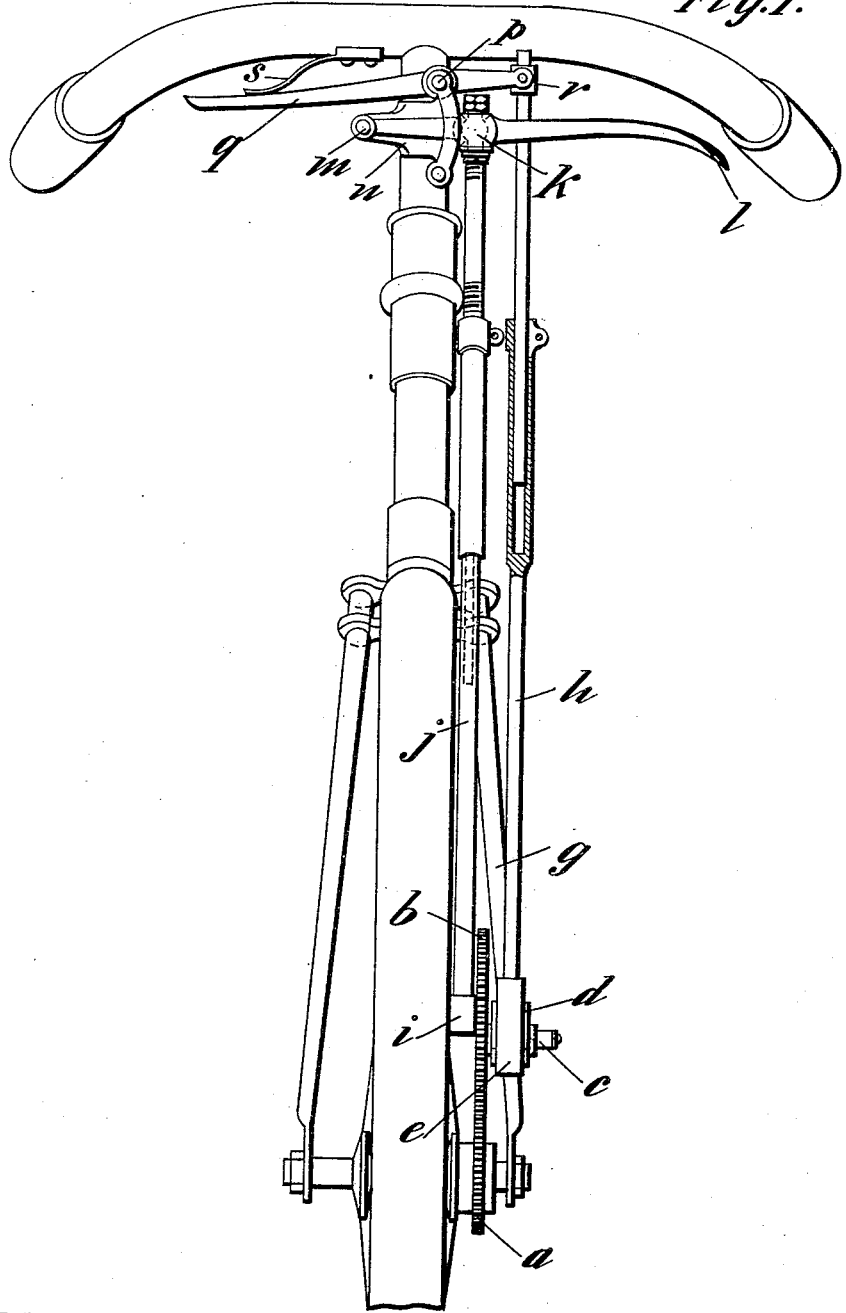
Witnesses
Inventor No. 633,612. Patented Sept. 26, 1899.
T. J. PSIMENOS.
BICYCLE.
(Application filed Jan. 7, 1899.)
(No Model.) 2 Sheets—Sheet 2.
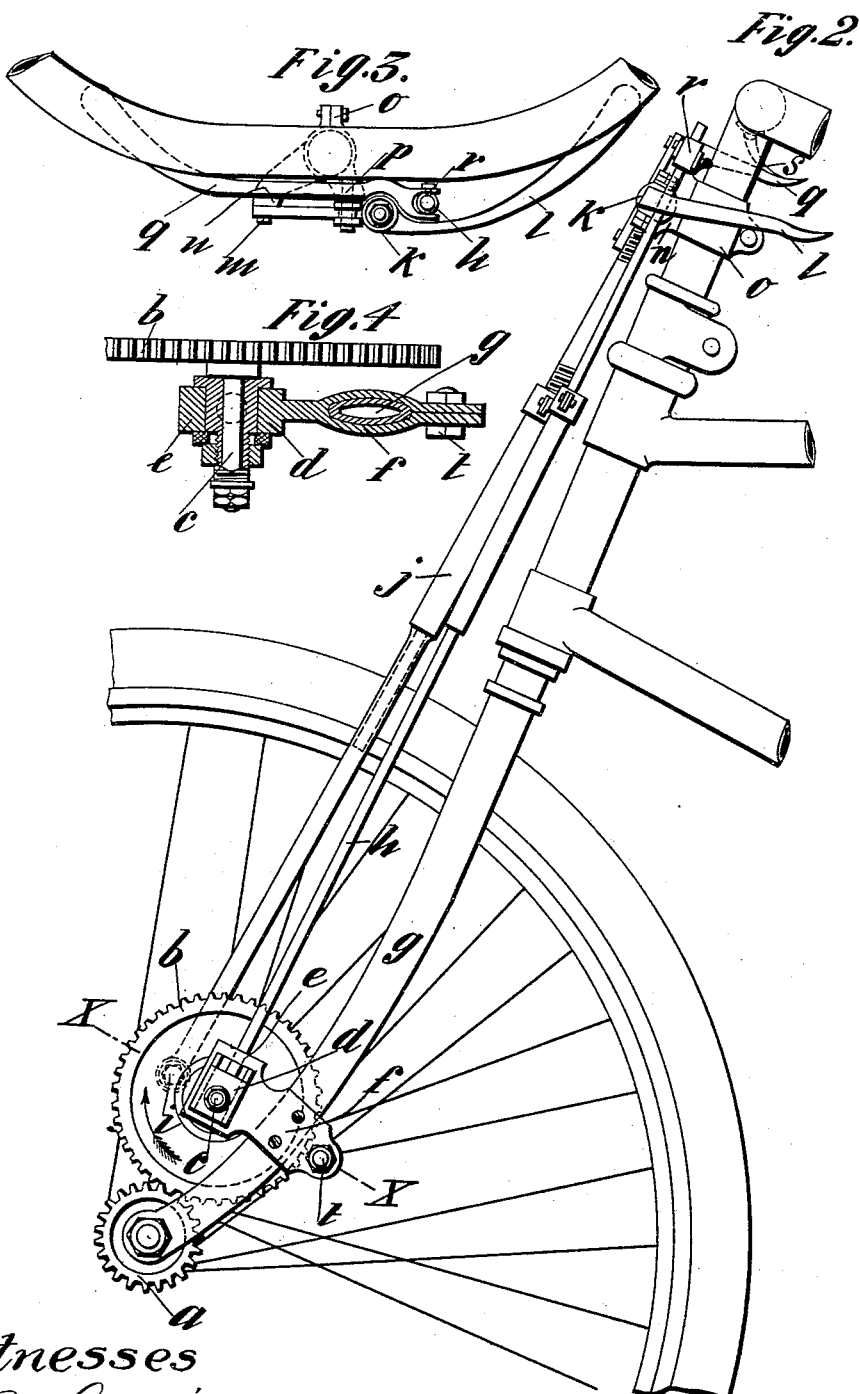

UNITED STATES PATENT OFFICE.

THEODORE JOHNS PSIMENOS, OF LONDON, ENGLAND.

BICYCLE.

SPECIFICATION forming part of Letters Patent No. 633,612, dated September 26, 1899.

Application filed January 7, 1899. Serial No. 701,510. (No model.)

*To all whom it may concern:*

Be it known that I, THEODORE JOHNS PSIMENOS, a citizen of Greece, residing at 4 Cullum street, in the city of London, England, have invented certain new and useful Improvements in or Applicable to Bicycles and other Velocipedes, (for which I have made application for a patent in Great Britain, No. 24,947, dated November 25, 1898,) of which the following is a specification.

My invention relates to improved mechanism whereby the front steering-wheel of a bicycle or other velocipede can be driven by hand by the rider at the same time that he drives the back wheel or wheels by the usual pedal action. Various arrangements have heretofore been proposed for this purpose, all of which, however, are open to the objection that they require a greater or less alteration in the construction of the bicycle in order to adapt it to the above-named purpose.

My invention has for its object to obviate this disadvantage; and it consists in so constructing the mechanism required for the above-named purpose that it can be applied to a bicycle or other velocipede without any alteration of the existing construction beyond the fixing of a toothed pinion upon the hub of the steering-wheel, so the propelling apparatus can be applied without difficulty to all existing machines. I will describe the construction which I employ for this purpose with reference to the accompanying drawings, in which—

Figure 1 shows a front view of the steering-wheel and fork of a bicycle with my invention applied thereto. Fig. 2 shows a side view of the same. Fig. 3 shows a plan. Fig. 4 shows a section at X X, Fig. 2, to an enlarged scale.

The hub of the steering-wheel has fixed upon it a toothed pinion $a$, with which can be put in gear a toothed wheel $b$, the axis $c$ of which is carried by a block $d$, that can slide up and down to a slight extent in the loop $e$ of a bracket $f$, that is secured by a clamping-screw $t$ to the one limb $g$ of the steering-fork. To the block $d$ is fixed a rod $h$, preferably made telescopic for adjustment, as shown, and having its upper end connected, as will be presently described. The wheel $b$ carries a crank-pin $i$, on which is pivoted a telescopically-adjustable connecting-rod $j$, whose upper end is connected by a ball-and-socket joint at $k$ to a hand-lever $l$. This lever is pivoted at $m$ to a bracket $n$, which is formed with clamping-ring $o$, that is secured upon the stem of the steering-handle by a clamping-screw. To the bracket $n$ is pivoted at $p$ a second hand-lever $q$, to which is pivoted at $r$ the upper end of the before-mentioned rod $h$, fixed to the sliding block $d$, carrying the spur-wheel $b$. The lever $q$ ordinarily has its free end pressed downward by a spring $s$, fixed to the handle-bar, whereby the other end is raised, so as to keep the spur-wheel $b$ raised out of gear with the pinion $a$.

When it is desired to drive the steering-wheel, the lever $q$ is first grasped by the one hand while holding the handle-bar so as to lower the spur-wheel $b$ into gear with the pinion $a$, after which lever $l$ is grasped by the other hand holding the handle-bar so as to bring it close up to the latter, thereby raising the rod $j$ and causing it to turn the wheel $b$ in the direction of the arrow, Fig. 1, so as to propel the steering-wheel. When the lever $l$ has been drawn up to the full extent, the crank-pin $i$ will be at the top of the crank-circle, so that on now releasing lever $l$ wheel $b$ in continuing to be rotated by the impetus imparted to the steering-wheel will carry the crank-pin down through the other half of the circle, carrying the lever $l$ down with it, and when this has arrived at the lowest position it is again grasped by the hand, as before, to continue the propulsion.

It will be seen from the above description that the application of the propelling mechanism to a bicycle or other velocipede involves no alteration of the machine beyond the fixing on of the pinion $a$ and that the entire mechanism is secured in position by the two clamping attachments $t$ and $o$.

It will also be seen that the above-described mechanism will also serve as an efficient brake by putting the wheel $b$ in gear with $a$ and resisting the forward rotation of the latter, and consequently of the steering-wheel, by grasping lever $l$, so as to impede its descending motion. Thus the additional expense of the propelling mechanism is partly compensated for by dispensing with the ordinary brake-gear.

Having now particularly described and ascertained the nature of this invention and in what manner the same is to be performed, I declare that what I claim is—

1. Mechanism for driving the steering-wheel of a bicycle or other velocipede by hand, comprising a looped bracket arranged to be clamped to a steering-fork, a sliding block contained in the bracket, a toothed wheel mounted on the sliding block and arranged to engage a toothed pinion on the hub of the steering-wheel, a hand-lever pivoted to a bracket arranged to be clamped on the handle-bar stem, a rod connecting the said lever and the sliding block in the looped bracket, a rod having a crank-pin connection with the toothed wheel mounted on the sliding block and an operating-lever for the rod; substantially as described.

2. In mechanism for driving the steering-wheel of a bicycle or other velocipede, a bracket arranged to be secured on the handle-bar stem, a hand-lever $l$ pivoted to the bracket, a second hand-lever $q$ also pivoted to the same bracket, a toothed wheel arranged to drive the steering-wheel, and having a crank and rod connected to the hand-lever $l$, and a rod connecting the lever $q$ to the bearing of the toothed driving-wheel, and arranged to raise and lower the same; substantially as described.

In testimony whereof I have hereunto set my hand in presence of two subscribing witnesses.

THEODORE JOHNS PSIMENOS.

Witnesses:
JNO. P. M. MILLARD,
FRED. C. HARRIS.